Patented Jan. 30, 1945

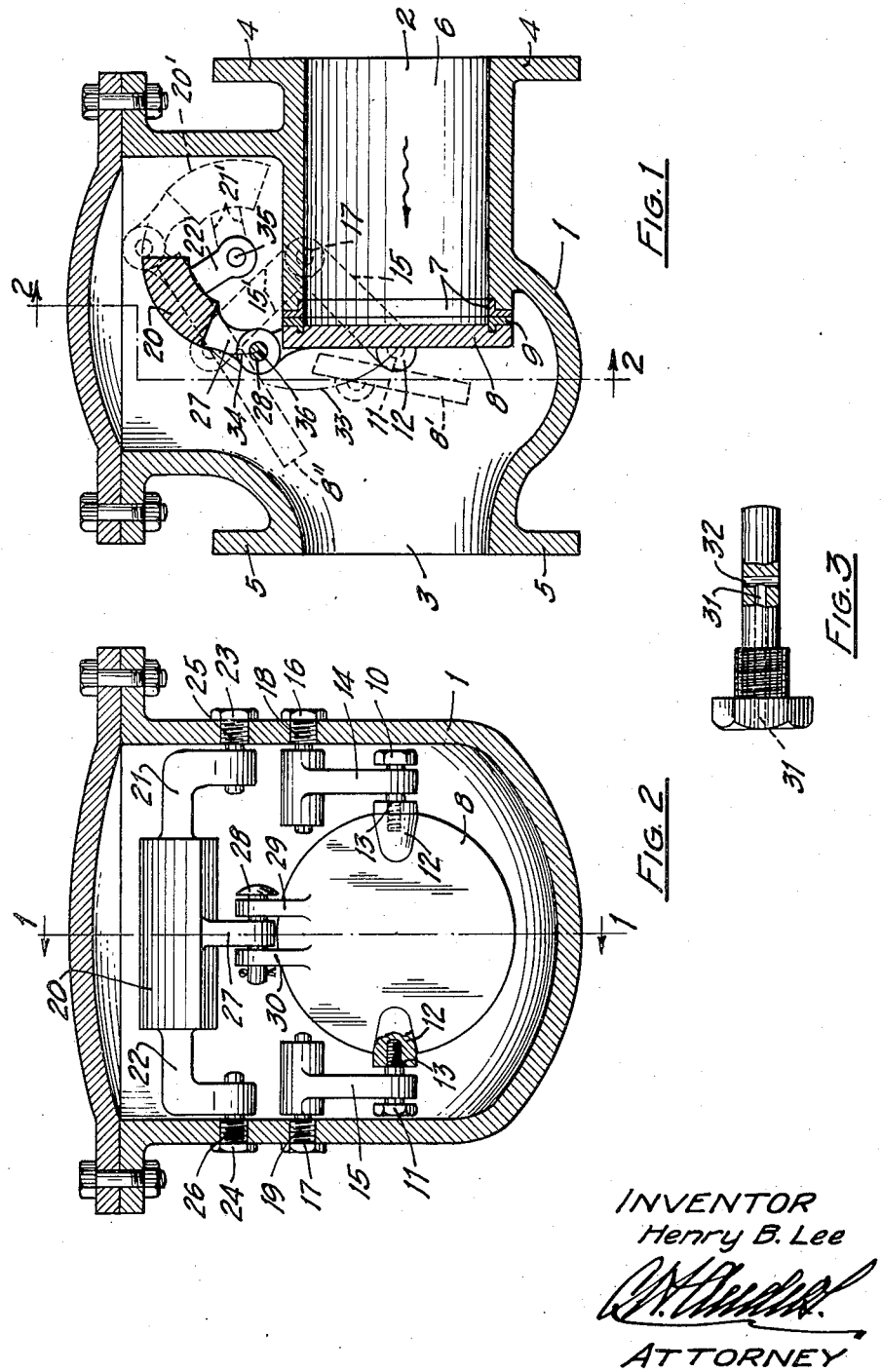

2,368,149

UNITED STATES PATENT OFFICE 2,368,149

CHECK VALVE

Henry B. Lee, Troy, N. Y., assignor to The Ludlow Valve Manufacturing Co., Inc., Troy, N. Y., a corporation of New York Application July 9, 1943, Serial No. 494,101

10 Claims. (Cl. 251—126)

My invention relates to check valves and particularly to an improved design in which the gate is in substantially balanced equilibrium when the valve is fully open.

The gate in an ordinary check valve is held in open position against the force of gravity by the stream of water flowing through the valve, and is in its position of most unstable equilibrium when it is fully open. Thus, since considerable energy is required to hold the gate in open position, this energy is absorbed from the moving stream of water with the result that there is a substantial loss in stream velocity and effective head. Furthermore, in pump lines in which there is a considerable head of water on the discharge side of the check valve great potential energy is stored therein and, when the pumps are shut off this mass of water begins to flow back through the check valve during the closing thereof. Great kinetic energy is developed by this moving mass of water with the result that, the gate slams shut and high pressures are developed in the pipe line on the discharge side which frequently result in burst pipes.

One of the objects of my invention is to provide a check valve in which the loss in effective head and velocity due to the energy which is absorbed in maintaining the gate in open position is very substantially reduced. Another object is to provide a check valve of such design that the gate will close more slowly than in the usual designs and thus avoid the high pipe line stresses caused by a sudden slamming shut of the valve.

With these objects in view my invention includes the novel elements and the combinations and arrangements thereof described below and illustrated in the accompanying drawing in which Fig. 1 is a longitudinal, vertical section through the valve in the plane 1—1 of Fig. 2;

Fig. 2 is a section of Fig. 1 in the plane 2—2 and

Fig. 3 is an elevation view of a trunnion screw.

Referring to the drawing, my valve comprises a body 1, having an inlet 2 and an outlet 3 which are shown as provided with flanges 4 and 5, respectively, whereby the valve is adapted to be connected in a pipe line. Within the body, the inlet passage 6 is provided with the usual valve seat 7 which cooperates with the gate 8 provided with the usual seating ring 9. The gate instead of being merely pivoted at the top as is the case in the simplest form of check valve is provided with a plurality of axes of suspension so that, instead of having a simple swinging movement in opening and closing in which all points move in circular arcs about a fixed axis, its movements are so controlled that, in opening, the vertical component of initial motion is substantially in excess of the horizontal component, and, thereafter, an accelerated tilting motion is imparted to the gate until it reaches a position where it is substantially balanced equilibrium entirely, or substantially entirely, above the column of water moving through the valve.

In the first instance the gate 8 may be considered as pivotally supported on the trunnion screws 10 and 11 which are coaxial, and the axes of which are substantially the horizontal diameter of the gate. The trunnion screws 10 and 11 are threaded into bosses 12 which are cast on the gate, and the screws 10 and 11 are provided with shoulders 13 which abut the faces of the bosses. The trunnion screws 10 and 11 are, in turn, carried by the links or arms 14 and 15, respectively, which are pivoted on the screws 16 and 17, respectively, threaded into the body, as shown at 18 and 19.

Above the gate is a counterweight 20 having side arms 21 and 22 which are pivotally mounted on the trunnion screws 23 and 24, respectively, threaded into the valve body, as shown at 25 and 26. The counterweight 20 is provided with a centrally-disposed, depending arm 27 which is pivotally secured to the top of the gate by the pin 28 which passes therethrough and also through the lugs 29 and 30 cast integral with the gate.

As shown in Fig. 1 it will be noted that the axis of the trunnion screws 16 and 17 is positioned substantially at the level of the top of the inlet passage and is substantially nearer the inlet opening 2 in the body than the gate itself. The common axis of the trunnion screws 23 and 24 is illustrated as positioned in substantially vertically spaced relation to the common axis of the trunnion screws 16 and 17. The trunnion screws 16, 17, 23 and 24 may be substantially identical, although as illustrated there is some difference in length, and each may be provided with an axial passage 31 and a transverse passage 32 (see Fig. 3) through which oil or grease may be introduced to lubricate the trunnion bearings.

In operation, water flowing into the valve in the direction of the arrow shown in Fig. 1 forces the gate away from its seat and the common axis of the trunnion screws 10 and 11 moves in the path indicated by the dot and dash line 33 in Fig. 1. It will be noted that this path of movement is both outwardly away from the seat, or toward the body outlet 3, and also upwardly. The movement of the axis of the pin 28 is shown by the dot and dash line 34 in Fig. 1, and it will be noted that this axis moves substantially vertically, upwardly through a substantial distance before its horizontal movement is appreciable. Thus the gate moves initially from its cooperating seat to the position shown in fragmentary dotted outline 8' although it does not tilt appreciably from the position shown by the solid lines in Fig. 1.

The counterweight 20 swings in a circular arc about the common axis 35 of the trunnion screws 23 and 24, and the axis 36 of the pin 28 moves in a circular path 34 about 35 as a center. (See Fig. 1.)

Because the axis 36 of the pin 28 is somewhat below the common axis 35 of the trunnion pins 23 and 24 it also moves slightly toward the outlet 3 and away from the seat 7 during the initial movement of the valve and, thereafter, when the axis 36 has reached a point a substantial distance above a horizontal plane through the axis 35, its horizontal movement in a direction towards the inlet side of the body increases rapidly while its vertical movement decreases. When the counterweight 20 has swung completely over to the position 20' shown in dotted lines in Fig. 1 the valve 8 is in the position 8'' also shown in dotted outline. The links or arms 14 and 15 move to the position shown by the dotted lines 15' in Fig. 1, and the side arms 21 and 22 on the counterweight move to the position 21' shown in dotted outline in Fig. 1. In other words, in full open position, the gate is positioned above the seat with a substantial portion disposed on each side of the plane of said seat.

The mass of the counterweight 20 necessary to provide practically balanced equilibrium for the gate when fully opened, of course, depends on the combined mass of the gate and its associated parts, and also upon the relative horizontal distances of the center of gravity thereof from the axis of the trunnion screws 16 and 17, and the center of gravity of the counterweight from the axis 35 of the trunnion pins 23 and 24. In the open position of these parts, as shown by the dotted outlines in Fig. 1, the mass of the counterweight should be such as almost but not quite to balance the gate and its associated elements. In the open position the center of the gravity of the counterweight is on one side of the axis 35 and the axis of screws 16 and 17 while the center of gravity of the gate and its associated parts is on the other side of these axes and the parts are approximately balanced thereon when the valve is in open position.

In closed position, however, the center of gravity of the counterweight and the center of gravity of the valve 8 and its associated parts are both on the same side of these axes. In other words the gate and counterweight assembly is in a state of very substantially unbalanced equilibrium when the valve is fully closed, but in approximately balanced equilibrium when the gate is fully opened. Thus substantially no energy is absorbed from the flowing water in order to maintain the gate fully open. This is almost exactly the opposite of the usual arrangement. In closing, the movements of the gate are of course the reverse of those just described in connection with the opening of the valve, with the result that the disadvantage attendant upon slamming shut are practically eliminated.

While I have described my invention in its preferred embodiment it is to be understood that the words which I have used are words of description rather than of limitation and that changes within the purview of the appended claims may be made without departing from the true scope and spirit of my invention.

What I claim is:

1. A check valve comprising a body provided with an inlet and an outlet, a valve seat in said body, a gate adapted to cooperate with said seat, a pivotal mounting for said gate adapting it to swing upwardly and away from said seat, a counterweight, a pivotal connection securing said weight to said gate, and a separate pivotal mounting on said body for said counterweight; the center of gravity of said counterweight and the center of gravity of said gate being disposed on opposite sides of the axes of said pivotal mountings when said valve is fully open and on the same side thereof when said valve is closed, and the relative masses of said gate and weight being such as approximately to balance the assembly on said pivotal mountings when the valve is fully open.

2. A check valve comprising a body provided with an inlet and an outlet, a valve seat in said body, a gate adapted to cooperate with said seat, a pivotal mounting for said gate adapting it to swing upwardly and away from said seat, a counterweight, a pivotal mounting on said body for said counterweight positioned substantially below the center of gravity thereof when said valve is closed, and means pivotally connecting said counterweight and said gate; the center of gravity of said counterweight and the center of gravity of said gate being disposed on opposite sides of the axis of the pivotal mounting for said gate when said valve is fully opened and on the same side thereof when said valve is closed, and the relative masses of said weight and gate being such as approximately to balance the assembly when the valve is fully open.

3. A check valve comprising a body provided with an inlet and an outlet, a valve seat therein, a gate cooperating with said seat, a counterweight, means pivotally connecting said gate to said body, means pivotally connecting said gate to said counterweight, and means pivotally connecting said counterweight to said body; said connecting means being so constructed and arranged that said gate can swing upwardly to a position over said seat with a substantial portion thereof disposed on each side of the plane of said seat.

4. A check valve comprising a body provided with a fluid inlet and an outlet, a valve seat therein, a gate adapted to cooperate with said seat, means pivotally connecting said gate to said body and having its pivotal axis higher than the center of said seat and intermediate said seat and said inlet, and means positioned above said seat and pivotally connected to said body and to said gate for approximately balancing said gate on said axis when said valve is fully open.

5. A check valve comprising a body provided with a fluid inlet and an outlet, a valve seat therein, a gate adapted to cooperate with said seat, means pivotally connecting said gate to said body and having its pivotal axis higher than the center of said seat and intermediate said seat and said inlet, a counterweight for said gate, means pivotally connecting said weight to said gate and means pivotally connecting said weight to said body; said last mentioned means having its axis above said first mentioned axis and disposed below the center of gravity of said weight when said gate is closed.

6. A check valve comprising a body, a valve seat therein, a gate adapted to cooperate with said seat, a counterweight for said gate, means pivotally connecting said counterweight to said gate, means pivotally connecting said counterweight to said body, and means pivotally connecting said gate to said body; the axes of said pivotal connecting means being so constructed and arranged that the vertical component of the opening movement of the top of said gate initially substantially exceeds the horizontal component thereof, and thereafter, and as said gate approaches full open position, the horizontal component of said movement substantially exceeds the vertical component thereof.

7. In a check valve, the combination with a body provided with a fluid inlet and an outlet, and having a valve seat therein between said inlet and outlet, of a gate cooperating with said seat, means pivotally connecting said gate to said body, a counterweight for approximately balancing said gate when open, means pivotally connecting said weight to said body, and means pivotally connecting said weight to said gate; the pivotal axes of said means connecting said gate and said weight to said body being nearer the inlet side of said body than said valve seat; whereby said gate may swing upwardly to a position substantially over said seat when fully open.

8. A check valve comprising a body provided with an inlet and an outlet, a valve seat in said body, a gate cooperating with said seat, means for supporting said gate providing two, spaced horizontal axes on which said gate may move; one of said axes being disposed in fixed relation to said body and the other movable with said gate about said fixed axis; a counterweight for approximately balancing said gate in full open position, means pivotally connecting said counterweight to said body, and means pivotally connecting said counterweight to said gate.

9. A check valve comprising a body provided with an inlet and an outlet, a valve seat in said body, a gate cooperating with said seat, oppositely disposed trunnions on said gate providing a floating axis on which said gate may tilt, arms pivotally connecting said trunnions to said body, a counterweight adapted approximately to balance said gate when fully open, means pivotally connecting said weight to said body and means pivotally connecting said weight to the top of said gate.

10. In a check valve, the combination with a body provided with a fluid inlet and an outlet, of a valve seat therein, a gate adapted to cooperate with said seat, means pivotally connecting said gate to said body and guiding said gate under the influence of fluid under pressure entering and flowing through said valve first, to move in a direction away from said seat without substantially tilting said gate, and thereafter to swing said gate upwardly into a position over said seat with a substantial portion thereof disposed on each side of the plane of said seat, and means for maintaining said gate in approximately balanced equilibrium in said position; whereby, only a small amount of energy is absorbed from the fluid flowing through said valve in maintaining said gate fully open.

HENRY B. LEE.